(12) United States Patent
Fukuda et al.

(10) Patent No.: US 6,417,311 B1
(45) Date of Patent: Jul. 9, 2002

(54) CURABLE COMPOSITIONS OF FLUORINATED AMIDE POLYMERS

(75) Inventors: Kenichi Fukuda; Mikio Shiono, both of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/654,520

(22) Filed: Sep. 1, 2000

(30) Foreign Application Priority Data

Sep. 3, 1999 (JP) .......................................... 11-250933

(51) Int. Cl.[7] .............................................. C08G 77/24
(52) U.S. Cl. ........................... 528/42; 525/431; 528/15; 528/26; 528/28; 528/31; 528/32
(58) Field of Search .............................. 528/15, 31, 32, 528/42, 26, 28; 525/431

(56) References Cited

U.S. PATENT DOCUMENTS 5,047,287 A  *  9/1991  Horiuchi et al.
5,441,782 A  *  8/1995  Kawashima et al.
5,656,711 A     8/1997  Fukuda et al.
5,936,111 A  *  8/1999  Tarumi et al.

FOREIGN PATENT DOCUMENTS

EP  0765916  4/1997
JP  9-95615   4/1997

OTHER PUBLICATIONS

Derwent WPI abstract of JP 6211881 (Aug. 21, 1994).

* cited by examiner

*Primary Examiner*—Robert Dawson
*Assistant Examiner*—Marc S. Zimmer
(74) *Attorney, Agent, or Firm*—Millen, White, Zelano & Branigan, P.C.

(57) ABSTRACT

A curable composition contains (A) a fluorinated amide compound having at least one alkenyl radical, (B) a fluorinated organohydrogensiloxane, (C) a platinum group compound, (D) an organosiloxane having at least one hydrogen atom directly attached to a silicon atom, and at least one epoxy and/or trialkoxysilyl radical attached to a silicon atom through a carbon atom or a carbon atom and an oxygen atom, and (E) a carboxylic anhydride. The composition firmly bonds to a variety of substrates such as PPS and nylon while curing into a fluorinated elastomer.

12 Claims, No Drawings

CURABLE COMPOSITIONS OF FLUORINATED AMIDE POLYMERS

This invention relates to curable compositions which firmly bond to a variety of substrates such as polyphenylene sulfide and nylon while curing into fluorinated elastomers.

BACKGROUND OF THE INVENTION

Curable fluorinated elastomer compositions utilizing addition reaction between alkenyl and hydrosilyl radicals are well known in the art. It is also known from JP-A 9-95615 to add an organopolysiloxane having a hydrosilyl radical and an epoxy and/or trialkoxy radical as a third component to such a composition for rendering it self-adhesive. This composition can be cured by brief heating while it can bond to a variety of substrates during curing. Since the cured product has good solvent resistance, chemical resistance, heat resistance, low-temperature properties, low moisture permeability and electrical properties, the composition is useful in an adhesion application in a variety of industrial fields where such properties are required.

The composition forms a satisfactory bond to such plastics as epoxy resins, phenolic resins and polyester resins, but a less satisfactory bond to such engineering plastics as polyphenylene sulfide (PPS) and nylon. The composition is not applicable where PPS and nylon are used. Since PPS and nylon are often used as casing material, an improvement in bond to these engineering plastics is desired.

SUMMARY OF THE INVENTION

An object of the invention is to provide a novel and improved curable composition which cures into a fluorinated elastomer that firmly bonds to PPS and nylon.

The invention pertains to a curable composition of the addition curing type comprising a fluorinated amide compound having at least one alkenyl radical in a molecule, a fluorinated organohydrogensiloxane, and a platinum group compound. It has been found that by adding to this composition an organosiloxane having in a molecule at least one hydrogen atom directly attached to a silicon atom, and at least one epoxy and/or trialkoxysilyl radical attached to a silicon atom through a carbon atom or a carbon atom and an oxygen atom, and preferably further having a perfluoroalkyl or perfluoropolyether radical, as a tackifier and further adding a carboxylic anhydride as an adhesion reaction promoter, there is obtained a curable composition which cures into a fluorinated elastomer that not only has good solvent resistance, chemical resistance, heat resistance, low-temperature properties, low moisture permeability and electrical properties, but also firmly bonds to a variety of substrates including PPS and nylon.

Accordingly, the invention provides a curable composition comprising as essential components, (A) a fluorinated amide compound having at least one alkenyl radical in a molecule,
(B) a fluorinated organohydrogensiloxane,
(C) a platinum group compound,
(D) an organosiloxane having in a molecule at least one hydrogen atom directly attached to a silicon atom, and at least one of epoxy radicals and trialkoxysilyl radicals each attached to a silicon atom through a carbon atom or a carbon atom and an oxygen atom, and
(E) a carboxylic anhydride.

DESCRIPTION OF THE PREFERRED EMBODIMENT

Briefly stated, the curable composition of the invention contains (A) a fluorinated amide compound having an alkenyl radical as a base polymer, (B) a fluorinated organo-hydrogensiloxane as a crosslinker and chain extender, (C) a platinum group compound as a catalyst, (D) an organosiloxane as a tackifier, and (E) a carboxylic anhydride as an adhesion promoter.

Component (A) is a fluorinated amide compound which should have at least one alkenyl radical in a molecule, and preferably two alkenyl radicals at opposite ends. In the compound, fluorine is preferably contained as a monovalent perfluoroalkyl, monovalent perfluoropolyether, divalent perfluoroalkylene or divalent perfluoropolyether radical. Preferably the compound has the following linkage.

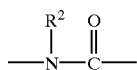

Further, the compound may have the following linkage.

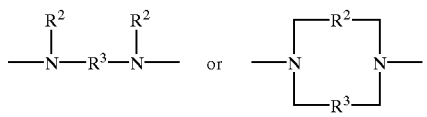

The fluorinated amide compound (A) is preferably of the following general formula (1).

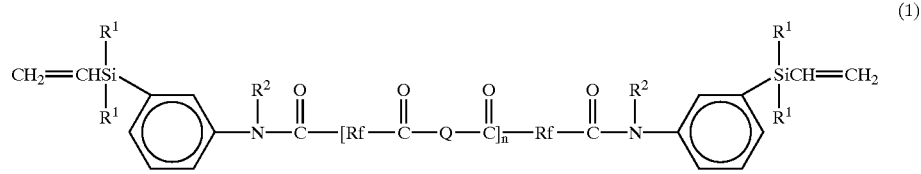

Herein $R^1$ is a substituted or unsubstituted monovalent hydrocarbon radical. $R^2$ is hydrogen or a substituted or unsubstituted monovalent hydrocarbon radical. Q is a radical of the following general formula (2) or (3):

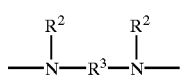

wherein $R^3$ is a substituted or unsubstituted divalent hydrocarbon radical which may be separated by at least one atom of oxygen, nitrogen and silicon atoms, and $R^2$ is as defined above,

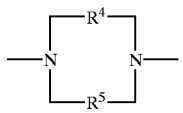

(3)

wherein $R^4$ and $R^5$ each are a substituted or unsubstituted divalent hydrocarbon radical. Rf is a divalent perfluoroalkylene or perfluoropolyether radical, and "a" is an integer of at least 0.

Referring to formula (1), $R^1$ stands for substituted or unsubstituted monovalent hydrocarbon radicals preferably of 1 to 10 carbon atoms, more preferably 1 to 8 carbon atoms, and also preferably free of aliphatic unsaturation. Examples include alkyl radicals such as methyl, ethyl, propyl, isopropyl, butyl, isobutyl, tert-butyl, pentyl, hexyl, octyl and decyl; cycloalkyl radicals such as cyclopentyl, cyclohexyl and cycloheptyl; alkenyl radicals such as vinyl, allyl, propenyl, isopropenyl, butenyl, and hexenyl; aryl radicals such as phenyl, tolyl, xylyl and naphthyl; aralkyl radicals such as benzyl, phenylethyl and phenylpropyl; and substituted ones of these radicals in which some or all of the hydrogen atoms are replaced by halogen atoms or the like, typically fluorinated alkyl radicals such as chloromethyl, chloropropyl, bromoethyl, 3,3,3-trifluoropropyl, and 6,6,6,5,5,4,4,3,3-nonafluorohexyl.

$R^2$ stands for hydrogen or substituted or unsubstituted monovalent hydrocarbon radicals preferably of 1 to 10 carbon atoms, more preferably 1 to 8 carbon atoms, and also preferably free of aliphatic unsaturation, as defined above for $R^1$. Examples of the monovalent hydrocarbon radicals are as exemplified above for $R^1$, for example, alkyl radicals such as methyl, ethyl, propyl, and isopropyl; cycloalkyl radicals such as cyclohexyl; alkenyl radicals such as vinyl and allyl; aryl radicals such as phenyl and tolyl; and substituted ones of these radicals in which some hydrogen atoms are replaced by halogen atoms or the like, typically fluorinated alkyl radicals such as chloromethyl, chloropropyl, 3,3,3-trifluoropropyl, and 6,6,6,5,5,4,4,3,3-nonafluorohexyl.

Q is a radical of the following general formula (2) or (3).

$$\begin{array}{c} R^2 \quad\quad R^2 \\ | \quad\quad\quad | \\ -N-R^3-N- \end{array} \quad (2)$$

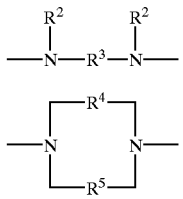

(3)

$R^2$ in formula (2) is as defined above. $R^3$ may be selected from substituted or unsubstituted divalent hydrocarbon radicals, preferably from divalent hydrocarbon radical of 1 to 20 carbon atoms, especially 2 to 10 carbon atoms. Examples include alkylene radicals such as methylene, ethylene, propylene, methylethylene, butylene and hexamethylene; cycloalkylene radicals such as cyclohexylene; arylene radicals such as phenylene, tolylene, xylylene, naphthylene and biphenylene; substituted ones of these radicals in which some hydrogen atoms are replaced by halogen atoms or the like; and combinations of these substituted or unsubstituted alkylene and arylene radicals.

$R^3$ may contain one or more atoms of oxygen, nitrogen and silicon atoms at an intermediate of its linkage. In this case, the oxygen atom intervenes in the linkage of $R^3$ in the form of —O—. The nitrogen atom intervenes in the linkage of $R^3$ in the form of —NR'— wherein R' is hydrogen, alkyl of 1 to 8 carbon atoms, especially 1 to 6 carbon atoms or aryl. The silicon atom intervenes in the linkage of $R^3$ in the form of a straight or cyclic organosiloxane-containing radical or organosilylene radical as shown below.

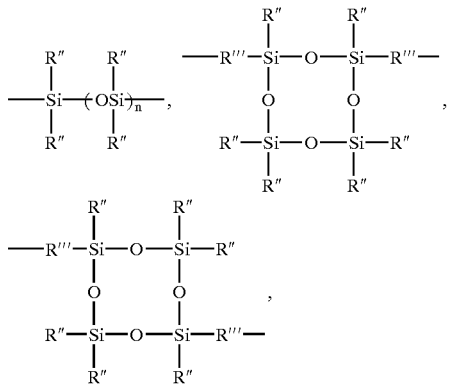

Herein, R'' is an alkyl radical of 1 to 8 carbon atoms or aryl radical as exemplified for $R^1$ and $R^2$, R''' is an alkylene radical of 1 to 6 carbon atoms or arylene radical as exemplified for $R^3$, and n is an integer of 0 to 10, especially 0 to 5.

Examples of these radicals are given below.

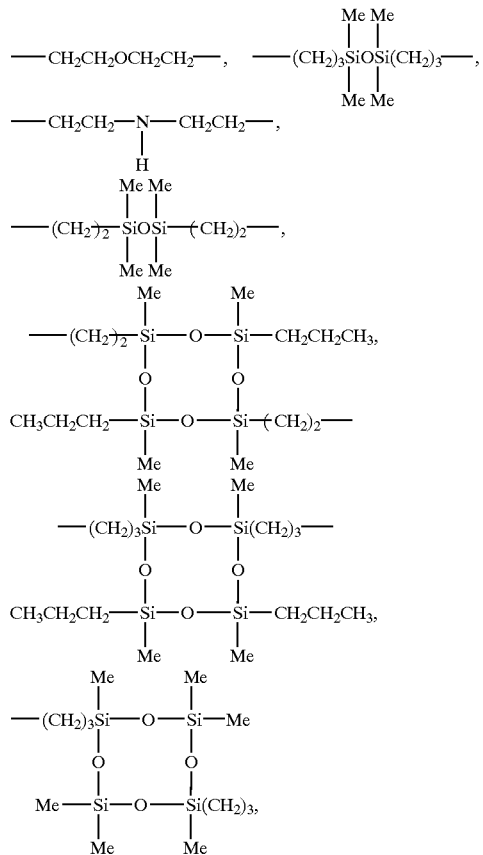

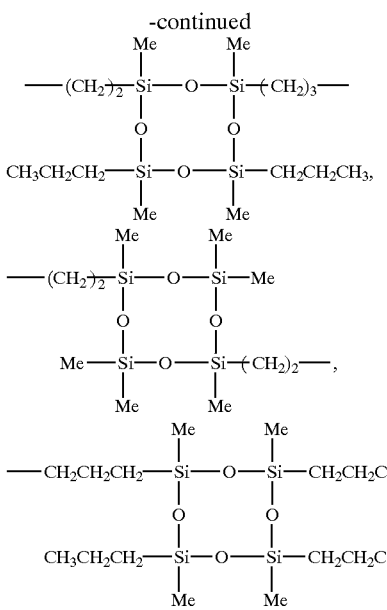

In the above formulae, Me is methyl.

In formula (3), $R^4$ and $R^5$ are substituted or unsubstituted divalent hydrocarbon radicals of 1 to 10 carbon atoms, especially 2 to 6 carbon atoms. Illustrative are alkylene radicals such as methylene, ethylene, propylene, methylethylene, butylene, and hexamethylene, cycloalkylene radicals such as cyclohexylene, and substituted ones of these radicals in which some of the hydrogen atoms are replaced by halogen atoms.

The radicals Q in formula (1), represented by formula (2) or (3), are exemplified below. In the following formulae, Me is methyl, Ph is phenyl, X is hydrogen, methyl or phenyl.

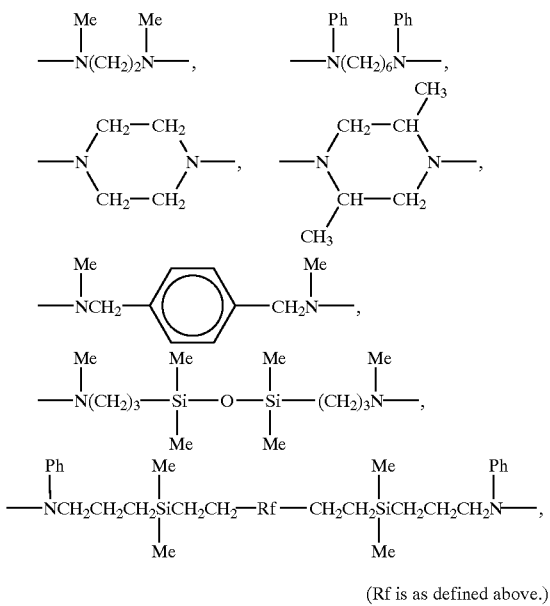

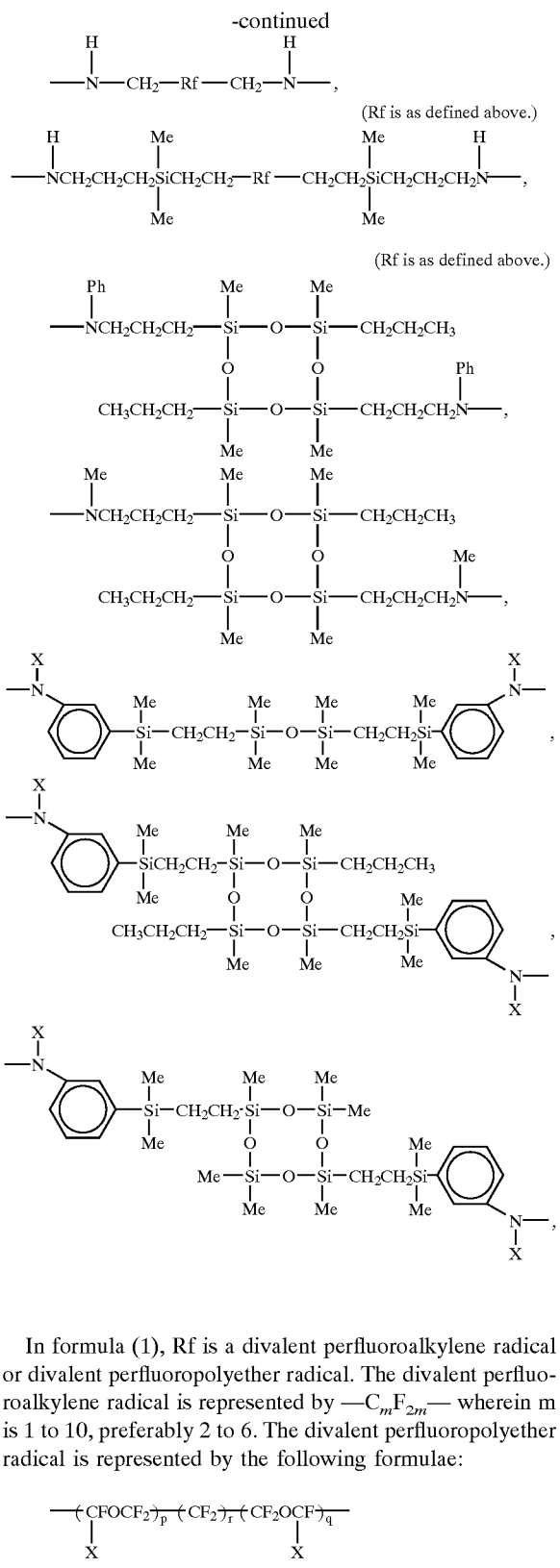

In formula (1), Rf is a divalent perfluoroalkylene radical or divalent perfluoropolyether radical. The divalent perfluoroalkylene radical is represented by $-C_mF_{2m}-$ wherein m is 1 to 10, preferably 2 to 6. The divalent perfluoropolyether radical is represented by the following formulae:

$$-\!\!\left(\!\underset{X}{C\!FOCF_2}\!\right)_{\!p}\!\!\left(CF_2\right)_{\!r}\!\!\left(\!\underset{X}{CF_2OCF}\!\right)_{\!q}\!\!-$$

wherein X is F or $CF_3$ radical, p, q and r are integers satisfying $p \geq 1$, $q \geq 1$, $2 \leq p+q \leq 200$, especially $2 \leq p+q \leq 110$, and $0 \leq r \leq 6$;

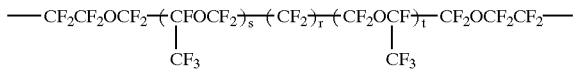

wherein r, s and t are integers satisfying $0 \leq r \leq 6$, $s \geq 0$, $t \geq 0$, and $0 \leq s+t \leq 200$, especially $2 \leq s+t \leq 110$;

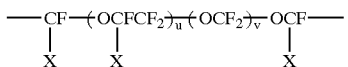

wherein X is F or $CF_3$ radical, u and v are integers satisfying $1 \leq u \leq 20$ and $1 \leq v \leq 20$;

wherein w is an integer of 1 to 100.
Illustrative examples of Rf are given below.

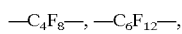

 n + m = 2 to 200,

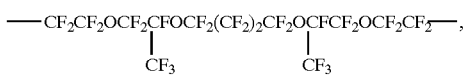

 $\bar{n}$=5 to 50, $\bar{m}$=1 to 10,

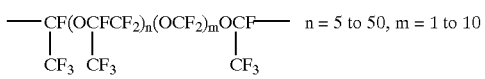 n = 5 to 50, m = 1 to 10

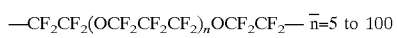 $\bar{n}$=5 to 100

In formula (1), letter "a" is an integer inclusive of 0, which indicates that the fluorinated amide compound of formula (1) contains at least one divalent perfluoroalkylene radical or divalent perfluoropolyether radical in a molecule. Preferably, "a" is an integer of 0 to 10, and more preferably 1 to 6.

The fluorinated amide compound (A) used herein may range from a low viscosity polymer having a viscosity of about several tens of centistokes at 25° C. to a solid gum-like polymer. From the standpoint of ease of handling, a gum-like polymer is suited for use as heat vulcanizable rubber, and a polymer having a viscosity of about 100 to 100,000 centistokes at 25° C. is suited for use as liquid rubber. With too low a viscosity, the resulting cured elastomer may be short in elongation and fail to provide a good profile of physical properties.

The fluorinated amide compound of formula (1) can be prepared by the following method. For example, a fluorinated amide compound of formula (1) wherein "a"=0 can be synthesized by reacting a compound having acid fluoride radicals at both ends represented by the general formula (4) with a primary or secondary amine compound represented by the general formula (5) in the presence of an acid acceptor such as trimethylamine.

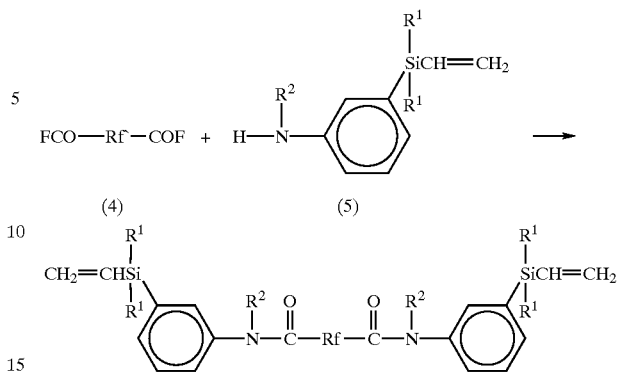

Herein, $R^1$, $R^2$ and Rf are as defined above.

Further, a fluorinated amide compound of formula (1) wherein "a" is an integer of at least 1 can be synthesized by reacting a compound having acid fluoride radicals at both ends represented by formula (4) with a diamine compound represented by the general formula (6):

 (6)

wherein Q is as defined above, in the presence of an acid acceptor, followed by reaction with a primary or secondary amine compound of formula (5).

In the former procedure, the relative amounts of the compound having acid fluoride radicals at both ends of formula (4) and the primary or secondary amine compound of formula (5) charged are not critical. Preferably the amount (a) of the compound of formula (4) and the amount (b) of the compound of formula (5) charged are adjusted such that the molar ratio of (a)/(b) may range from 0.1/1 to 1.2/1 mol/mol, and especially from 0.2/1 to 0.5/1 mol/mol.

In the latter procedure, the amount (a) of the compound of formula (4) and the amount (c) of the compound of formula (6) charged are not critical as long as the molar amount (a) is not smaller than the molar amount (c). The recurring units (a) in formula (1) may be set to an appropriate value for a particular purpose by adjusting the molar ratio of (a)/(c). With greater settings of (a)/(c), polymers having a relatively low molecular weight can be synthesized. With setting of (a)/(c) approximate to unity (1), polymers having a relatively high molecular weight can be synthesized.

Reaction conditions are not critical although the preferred conditions include 20 to 100° C. and 1 to 8 hours, and more preferably 20 to 50° C. and 2 to 4 hours.

It is noted that the fluorinated amide compound of formula (1) wherein Q is a linkage having an intervening silicon atom can be synthesized by first effecting reaction as mentioned above using an amine compound of formula (5) as the primary or secondary amine compound having an aliphatic unsaturated radical such as vinyl or allyl, thereby forming a vinyl-terminated compound of the following general formula (7), then reacting the compound of formula (7) with an organosiloxane compound having two hydrosilyl radicals in a molecule, as represented by the following general formula (8), in the presence of an addition reaction catalyst.

9

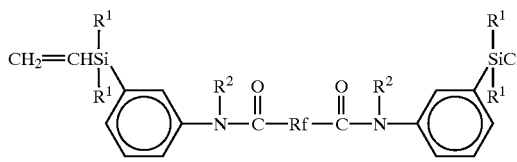

(7)

Herein R$^1$, R$^2$ and Rf are as defined above.

H—P—H         (8)

Herein P is a divalent organic radical having a siloxane linkage, illustrative examples of which are given below.

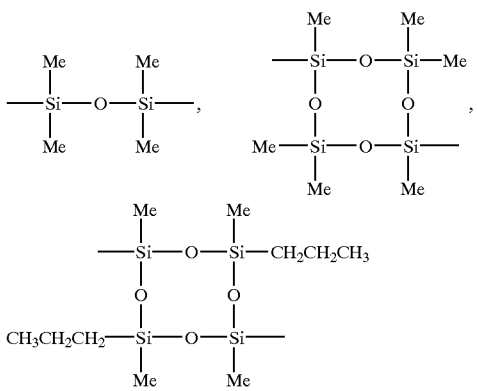

In this reaction, the relative amounts of the vinyl-terminated compound of formula (7) and the compound of formula (8) charged should be such that the molar amount (d) of the compound of formula (7) charged be greater than the molar amount (e) of the compound of formula (8) charged. The ratio of (d)/(e) is at most 2. That is, 1<(d)/(e)≦2. With greater settings of (d)/(e), polymers having a relatively low molecular weight can be synthesized. With setting of (d)/(e) approximate to unity (1), polymers having a relatively high molecular weight can be synthesized.

The catalyst used herein may be selected from elements of Group VIII in the Periodic Table and compounds thereof, for example, chloroplatinic acid, alcohol-modified chloroplatinic acid (see U.S. Pat. No. 3,220,972), complexes of chloroplatinic acid with olefins (see U.S. Pat. Nos. 3,159,601, 3,159,662 and 3,775,452), platinum black and palladium on such carriers as alumina, silica and carbon, rhodium-olefin complexes, and chlorotris(triphenylphosphine)rhodium (known as Wilkinson catalyst). Such a catalyst may be used in a catalytic amount. The above-described complexes are preferably used as solutions in alcohol, ketone, ether and hydrocarbon solvents.

The preferred reaction conditions include 50 to 150° C., more preferably 80 to 120° C. and 2 to 4 hours.

Component (B) is a fluorinated organohydrogensiloxane which serves as a crosslinker and chain extender for the fluorinated amide compound (A). The fluorinated organohydrogensiloxane should have at least one monovalent perfluorooxyalkyl (or perfluoropolyether), monovalent perfluoroalkyl, divalent perfluorooxyalkylene (or perfluoropolyether) or divalent perfluoroalkylene radical, and at least two, preferably at least three hydrosilyl radicals (i.e., Si—H radicals) in a molecule.

The perfluorooxyalkyl, perfluoroalkyl, perfluorooxyalkylene and perfluoroalkylene radicals are typically represented by the following general formulae.

10

Monovalent perfluoroalkyl radical:

$C_mF_{2m+1}$— wherein m is an integer of 1 to 20, and preferably 2 to 10.

Divalent perfluoroalkylene radical:

—$C_mF_{2m}$— wherein m is an integer of 1 to 20, and preferably 2 to 10.

Monovalent perfluorooxyalkyl radical:

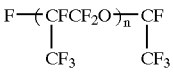

wherein n is an integer of 1 to 5.

Divalent perfluorooxyalkylene radical:

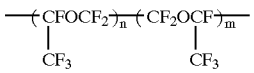

wherein an average of m+n is an integer of 2 to 100.

The fluorinated organohydrogensiloxane may be cyclic or chain-like or even three-dimensional network. Especially preferred are fluorinated organohydrogensiloxanes having in the molecule at least one monovalent organic radical containing a perfluoroalkyl, perfluoroalkyl ether or perfluoroalkylene, as shown below, as a monovalent substituent attached to a silicon atom.

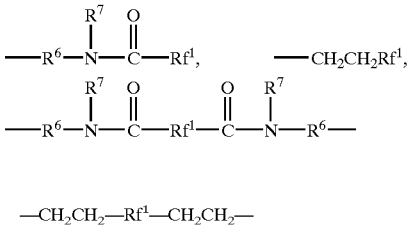

—CH$_2$CH$_2$—Rf$^1$—CH$_2$CH$_2$—

In the above formulae, R$^6$ stands for divalent hydrocarbon radicals of 1 to 10 carbon atoms, and especially 2 to 6 carbon atoms, for example, alkylene radicals such as methylene, ethylene, propylene, methylethylene, tetramethylene and hexamethylene, and arylene radicals such as phenylene. R$^7$ stands for hydrogen or monovalent hydrocarbon radicals of 1 to 8 carbon atoms, and especially 1 to 6 carbon atoms as described for R$^2$. Rf$^1$ stands for monovalent perfluoroalkyl, monovalent perfluorooxyalkyl, divalent perfluorooxyalkylene or divalent perfluoroalkylene radicals as described above.

In addition to the monovalent organic radical containing a mono or di-valent fluorinated substituent, i.e., a perfluoroalkyl, perfluorooxyalkyl, perfluorooxyalkylene or perfluoroalkylene radical, the fluorinated organohydrogensiloxane (B) has a monovalent substituent attached to a silicon atom, which is typically selected from aliphatic unsaturation-free monovalent hydrocarbon radicals of 1 to 10 carbon atoms, and especially 1 to 8 carbon atoms, as described for R$^2$.

In the fluorinated organohydrogensiloxane, the number of silicon atoms in a molecule is usually about 2 to 60, preferably about 4 to 30 though not limited thereto.

Examples of the fluorinated organohydrogensiloxane are given below. They may be used alone or in admixture of two or more. Note that Me is methyl and Ph is phenyl.

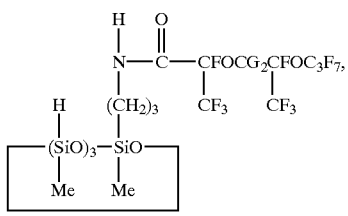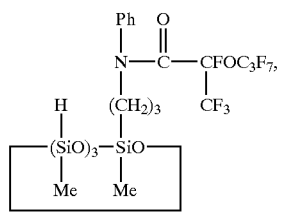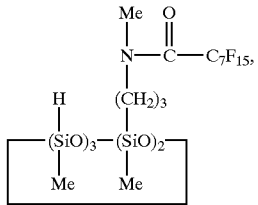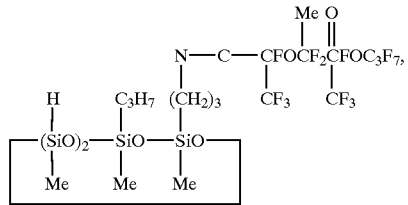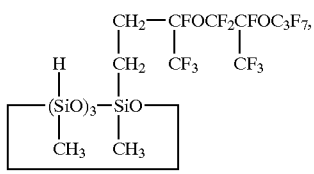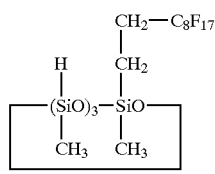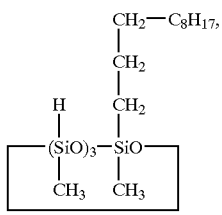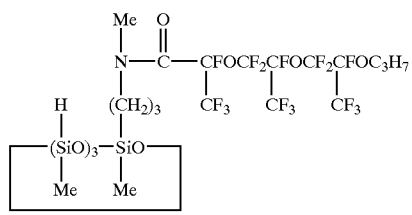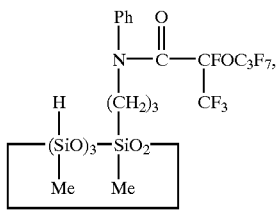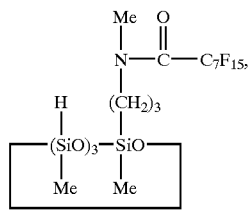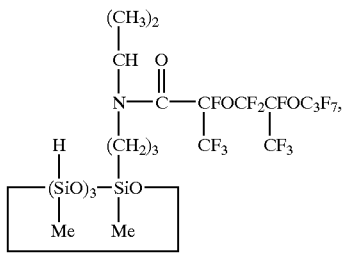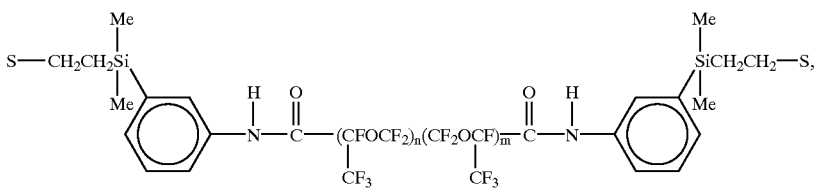

-continued

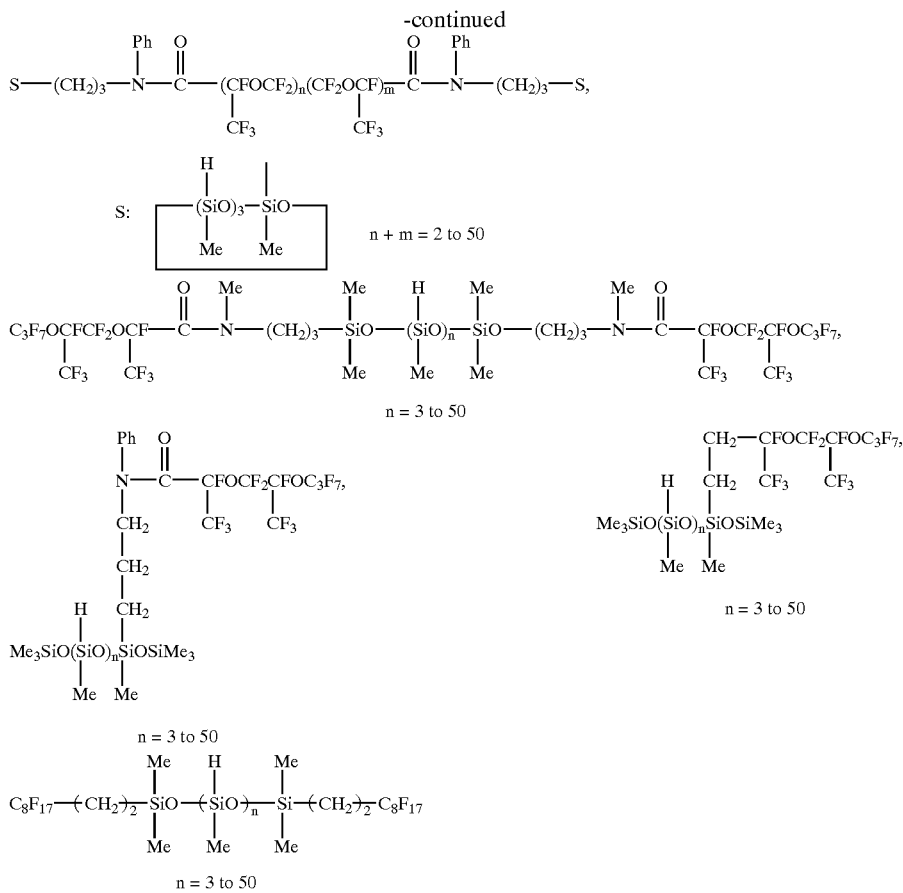

If the fluorinated organohydrogensiloxane (B) used is compatible with the fluorinated amide compound (A), then the curable composition will cure into a uniform product.

Component (B) is preferably used in such amounts that 0.5 to 5 mol, more preferably 1 to 2 mol of hydrosilyl radicals (i.e., Si—H radicals) are available per mol of aliphatic unsaturated radicals such as alkenyl (e.g., vinyl and allyl) and cycloalkenyl radicals in the entire composition. Amounts of component (B) giving less than 0.5 mol of Si—H radicals may achieve an insufficient degree of crosslinking. With excessive amounts of component (B) giving more than 5 mol of Si—H radicals, chain extension may become preferential, resulting in undercure, foaming, heat resistance decline and/or compression set decline. More illustratively, about 0.1 to 50 parts by weight of component (B) is preferably blended with 100 parts by weight of component (A).

Component (C) of the inventive composition is a platinum group compound for promoting addition reaction or hydrosilylation between the fluorinated amide compound (A) and the fluorinated organohydrogensiloxane (B), that is, a curing promoter. These compounds are generally noble metal compounds which are expensive, and therefore, platinum compounds which are relatively easily available are often employed.

The platinum compounds include, for example, chloroplatinic acid, complexes of chloroplatinic acid with olefins such as ethylene, complexes of chloroplatinic acid with alcohols and vinylsiloxanes, and platinum on silica, alumina or carbon, though not limited thereto. Known examples of the platinum group compounds other than the platinum compound are rhodium, ruthenium, iridium and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The catalyst may be used as such if it is a solid catalyst. However, to obtain a more uniform cured product, it is recommended that a solution of chloroplatinic acid or a complex thereof in a suitable solvent be admixed with the fluorinated amide compound (A) in a miscible manner.

The amount of the catalyst used is not critical and a catalytic amount may provide a desired cure rate. From the economical standpoint and to obtain a satisfactory cured product, the preferred amount of the catalyst is about 1 to 1,000 parts by weight, more preferably about 1 to 500 parts by weight of platinum group metal per million parts by weight of the entire composition.

Component (D) is an organosiloxane which renders the composition self-adhesive when blended therein. The organosiloxane should have in a molecule at least one hydrogen atom directly attached to a silicon atom (that is, at least one SiH radical), and at least one of epoxy radicals and trialkoxysilyl radicals each attached to a silicon atom through a carbon atom or a carbon atom and an oxygen atom, and preferably further have at least one perfluoroalkyl or perfluoropolyether radical attached to a silicon atom through a carbon atom (attached directly to that silicon atom).

The siloxane skeleton of the organosiloxane may be cyclic, chain-like or branched or a mixture thereof. These organosiloxanes are represented by the following average compositional formulae.

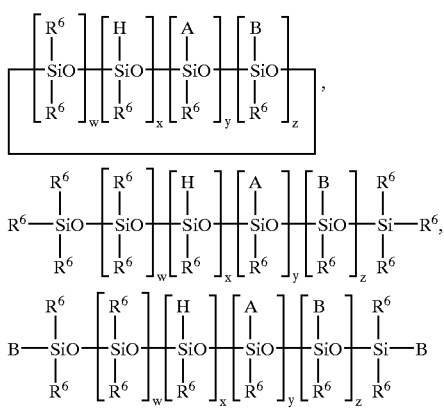

Herein $R^6$ is a substituted or unsubstituted monovalent hydrocarbon radical, as defined above for $R^1$. A is an epoxy and/or trialkoxysilyl radical attached to a silicon atom through a carbon atom or a carbon atom and an oxygen atom. B is a perfluoroether or perfluoroalkyl radical attached to a silicon atom through a carbon atom.

Illustrative examples of A are radicals of the following formula:

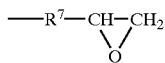

wherein $R^7$ is a divalent hydrocarbon radical of 1 to 10 carbon atoms, especially 1 to 5 carbon atoms, which may be separated by an oxygen atom, typically alkylene or cycloalkylene; and radicals of the following formula:

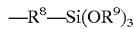

wherein $R^8$ is a divalent hydrocarbon radical of 1 to 10 carbon atoms, especially 1 to 4 carbon atoms, typically alkylene, and $R^9$ is a monovalent hydrocarbon radical of 1 to 8 carbon atoms, especially 1 to 4 carbon atoms, typically alkyl.

Illustrative examples of B are radicals of the following formulae:

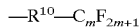

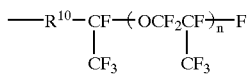

wherein $R^{10}$ is a radical as defined for $R^8$ or a radical as represented by

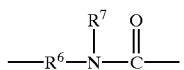

wherein $R^6$ and $R^7$ are as defined above, and m and n are as defined above.

The letters w, x and z each are an integer inclusive of 0, y is an integer of at least 1, and w+x+y+z is usually from about 2 to 60, and preferably about 4 to 30. In the case of a cyclic siloxane structure, the number of silicon atoms forming a siloxane ring is desirably from 3 to about 50 from the standpoint of ease of synthesis.

The organosiloxane (D) can be synthesized by effecting partial addition reaction of a compound having an aliphatic unsaturated radical (e.g., vinyl or allyl) and an epoxy and/or trialkoxysilyl radical and optionally, a compound having an aliphatic unsaturated radical and a fluoroalkyl or perfluoroether radical to an organohydrogenpolysiloxane having at least three hydrogen atoms each attached to a silicon atom (SiH radicals) in a molecule in a conventional manner. It is understood that the number of aliphatic unsaturated radicals should be smaller than the number of SiH radicals.

After the completion of reaction, the end compound may be isolated although the reaction product from which only the unreacted reactants and the addition reaction catalyst have been removed may be used as well.

Illustrative examples of the organosiloxane (D) are shown below by structural formulae. These compounds may be used alone or in admixture of two or more.

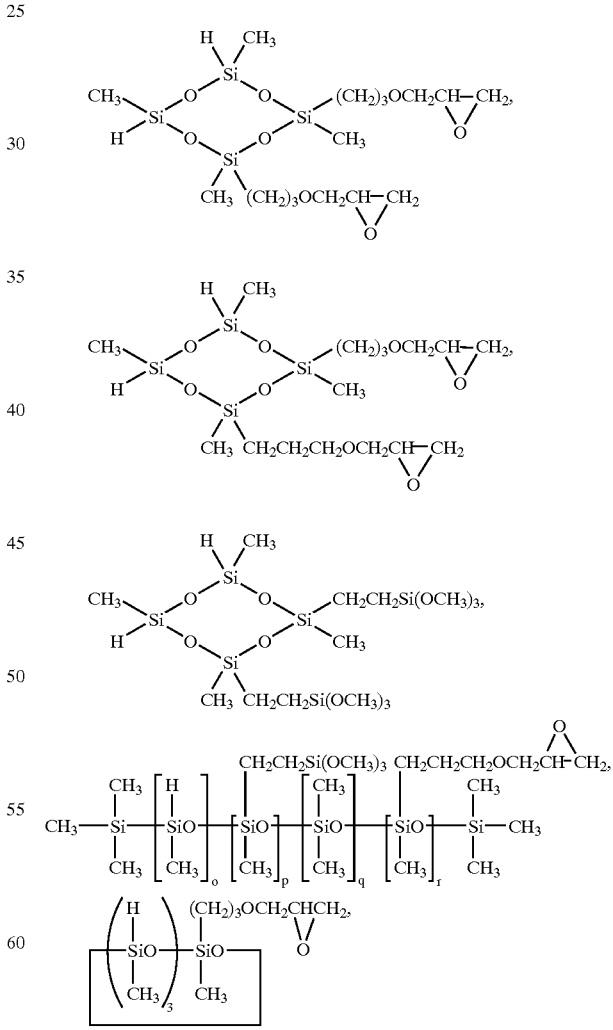

o, q and r are positive integers and
p is an integer inclusive of 0.

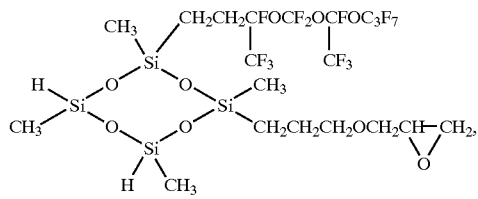

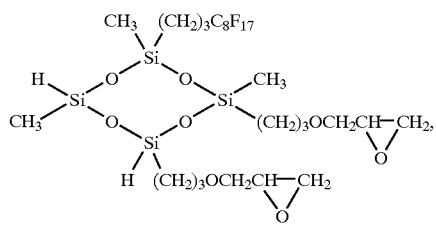

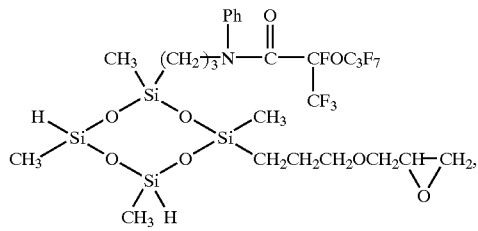

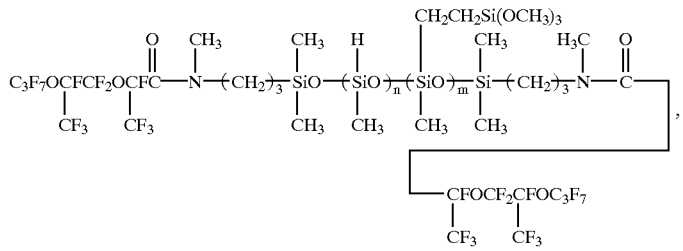

n + m = 3 to 50

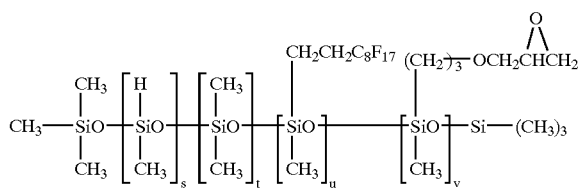

s, u and v are positive integers and
t is an integer inclusive of 0.

An appropriate amount of the organosiloxane (D) used is about 0.1 to 20 parts, more preferably about 0.3 to 10 parts by weight per 100 parts by weight of component (A). Less than 0.1 part of organosiloxane (D) may be insufficient to provide a satisfactory bonding force. More than 20 parts of organosiloxane (D) often inhibits cure and may adversely affect the physical properties of the cured product.

It is noted that the amount of component (B) blended is determined by taking into account the amount of component (D) blended as well as the amount of component (A). As previously described, component (B) is preferably used in such amounts that 0.5 to 5 mol of Si—H radicals are available per mol of aliphatic unsaturated radicals such as vinyl, allyl and cycloalkenyl radicals in the entire composition.

Component (E) is a carboxylic acid anhydride. Included are all carboxylic anhydrides used as the curing agent for epoxy resins. Examples are shown below.

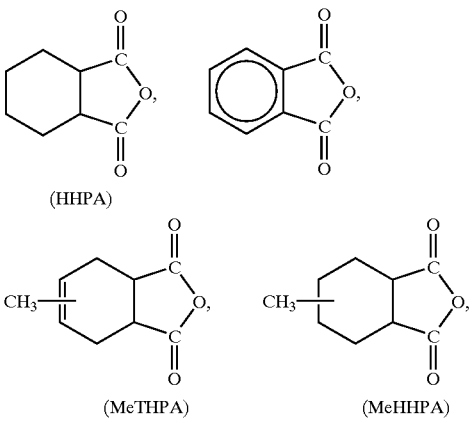

-continued

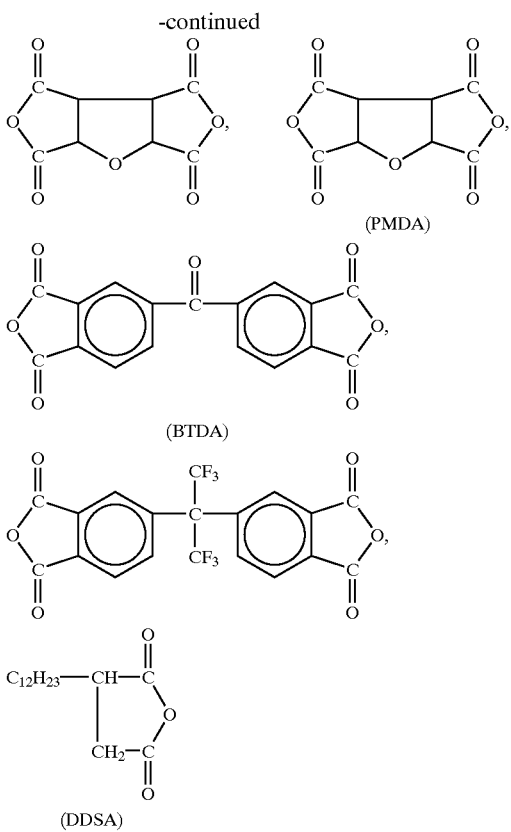

(PMDA)

(BTDA)

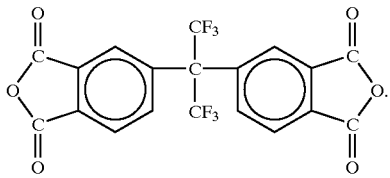

(DDSA)

Especially preferred of these carboxylic anhydrides are BTDA and

An appropriate amount of component (E) is about 0.1 to 4 parts by weight per 100 parts by weight of component (A). Less than 0.1 part of component (E) may be insufficient to provide a satisfactory bonding force. More than 4 parts of component (E) may inhibit cure and adversely affect the physical properties of the cured product.

In addition to the above-mentioned essential components, other optional components may be added to the inventive composition. Exemplary additives include reaction controlling agents such as acetylene compounds, vinylsiloxanes and ethylenically unsaturated isocyanurates; reinforcing or semi-reinforcing fillers such as fumed silica, precipitated silica and hydrophocized products thereof, quartz flour, fused quartz powder, diatomaceous earth, and calcium carbonate; inorganic pigments such as titanium oxide, iron oxide, carbon black, and cobalt aluminate; heat resistance modifiers such as titanium oxide, iron oxide, carbon black, cerium oxide, cerium hydroxide, zinc carbonate, magnesium carbonate, and manganese carbonate; heat conductive agents such as alumina, boron nitride, silicon carbide and powdered metals; and electroconductive agents such as carbon black, powdered silver and conductive zinc white. Furthermore, non-functional perfluoropolyether may be added as a plasticizer, viscosity adjusting agent or flexibility modifier.

There may also be added adhesive aids and silane coupling agents. The amounts of these optional components added are arbitrary insofar as they do not compromise the objects of the invention.

Any desired method may be used in preparing the composition of the invention. For example, components (A) to (E) and optional components are uniformly mixed by a suitable mixer such as a Ross mixer, planetary mixer, Hobert mixer or twin roll mill. The inventive composition is curable at room temperature depending on the functional radical in the fluorinated amide compound (A) and the catalyst (C) used. However, it is recommended to heat the composition in order to promote cure. In order that the composition bond to a variety of substrates, the composition is preferably cured by heating at a temperature of 60° C. or higher, especially 100 to 200° C. for several minutes to several hours.

On use of the curable composition of the invention, it may be dissolved in a suitable fluorochemical solvent such as m-xylene hexafluoride or fluorinate to an appropriate concentration depending on a particular application and purpose.

The curable compositions of the invention cure into products or fluorinated elastomers which have good solvent resistance, chemical resistance, heat resistance, low-temperature properties, and low moisture permeability, and form a firm bond to metal and plastic substrates by heating at a relatively low temperature for a brief time. Therefore, the compositions are useful as adhesives for electric and electronic parts, building sealing materials, and automotive rubber materials. Since the fluorinated elastomers as cured are adhesive to PPS and nylon, the compositions are useful in the bonding of such articles as PPS and nylon base casings.

EXAMPLE

Examples of the invention are given below by way of illustration and not by way of limitation. All parts are by weight. Viscosity is expressed in centistoke (cs) at 25° C.

Example 1

To 100 parts of a polymer (viscosity 4,400 cs, average molecular weight 16,500, vinyl content 0.013 mol/100 g) of the following formula (9) was added 10 parts of trimethylsiloxy-treated, fumed silica having a specific surface area of 300 m²/g. The ingredients were mixed, heat treated, then milled on a three roll mill. There were further added and mixed 2.3 parts of a fluorinated hydrogensiloxane of the following formula (10), 0.2 part of a toluene solution of a catalyst in the form of chloroplatinic acid modified with a compound of the following formula (11) (platinum concentration 0.5% by weight), 0.3 part of a 50% toluene solution of ethynylcyclohexanol, 0.8 part of a carboxylic anhydride of the following formula (12), and 2.5 parts of a tackifier of the following formula (13).

(9)
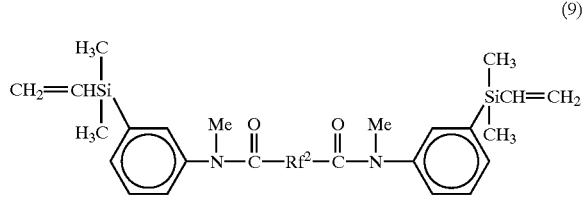

(10)
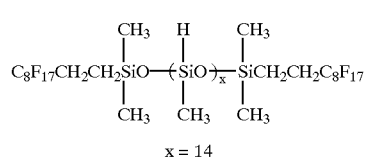
x = 14

(11)
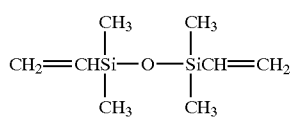

(12)
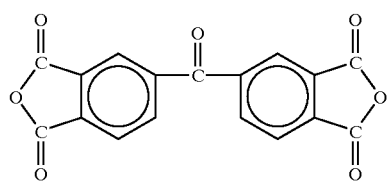

(13)
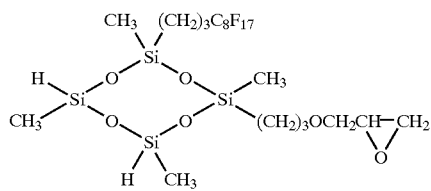

Next, a pair of 25 mm×100 mm test pieces of a plastic material (PPS, 66 nylon, epoxy resin, phenolic resin or polyester resin) were placed such that their longitudinal ends overlapped 10 mm and a layer of the composition of 1 mm thick was sandwiched between the overlapped ends. By heating at 150° C. for one hour, the composition was cured. The sample was then examined by a shear bond test. Shear bond strength and cohesive failure were determined, with the results shown in Table 1.

Separately, the cured composition was examined for physical properties, finding a hardness of 45 on JIS A scale, a tensile strength of 20 kgf/cm$^2$, and an elongation of 150%.

Comparative Example 1

A similar composition was prepared as in Example 1 except that the compound of formula (12) was omitted. The results of a bond test on this composition are shown in Table 1.

Example 2

A similar composition was prepared as in Example 1 except that 4 parts of trimethylsiloxy-treated, fumed silica having a specific surface area of 150 m$^2$/g was used instead of the silica in Example 1, 1.1 parts of a fluorinated hydrogensiloxane of the following formula (14) and 1.7 parts of a fluorinated hydrogensiloxane of the following formula (15) were used instead of the fluorinated hydrogensiloxane in Example 1, 0.5 part of a carboxylic anhydride of the following formula (16) instead of the carboxylic anhydride in Example 1, and 1.5 parts of a compound of the following formula (17) was added as the tackifier. Using this composition, a shear bond test was carried out. The curing conditions were 120° C. and 2 hours. The results are shown in Table 1.

Separately, the cured composition was examined for physical properties, finding a hardness of 25 on JIS A scale, a tensile strength of 11 kgf/cm$^2$, and an elongation of 220%.

(14)
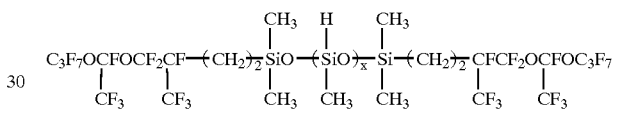
$\overline{x} = 15$

(15)
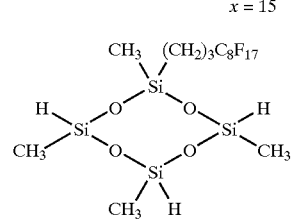

(16)
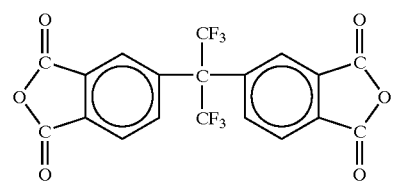

(17)
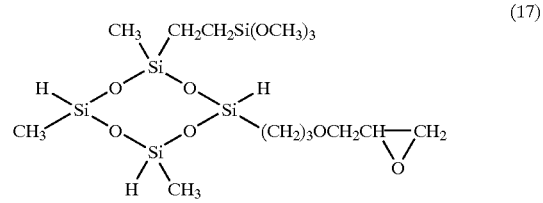

Comparative Example 2

A similar composition was prepared as in Example 2 except that the compound of formula (16) was omitted. The results of a bond test on this composition are shown in Table 1.

TABLE 1

|  | Example 1 | | Example 2 | | Comparative Example 1 | | Comparative Example 2 | |
| --- | --- | --- | --- | --- | --- | --- | --- | --- |
|  | Shear bond strength (kgf/cm$^2$) | Cohesive failure (%) | Shear bond strength (kgf/cm$^2$) | Cohesive failure (%) | Shear bond strength (kgf/cm$^2$) | Cohesive failure (%) | Shear bond strength (kgf/cm$^2$) | Cohesive failure (%) |
| PPS | 12.5 | 100 | 6.4 | 100 | 2.6 | 0 | 2.3 | 0 |
| 66 nylon | 10.8 | 100 | 7.2 | 100 | 4.0 | 20 | 4.8 | 30 |
| Epoxy resin | 12.8 | 100 | 7.9 | 100 | 11.3 | 100 | 6.8 | 100 |
| Phenolic resin | 11.5 | 100 | 7.7 | 100 | 10.7 | 100 | 7.0 | 100 |
| Polyester resin | 10.3 | 100 | 6.6 | 100 | 10.0 | 100 | 6.1 | 100 |

Japanese Patent Application No. 11-250933 is incorporated herein by reference.

Reasonable modifications and variations are possible from the foregoing disclosure without departing from either the spirit or scope of the present invention as defined by the claims.

What is claimed is:

1. A curable composition comprising as essential components,
   (A) fluorinated amide compound having at least two alkenyl radicals in a molecule,
   (B) a fluorinated organohydrogensiloxane,
   (C) a platinum group compound,
   (D) an organosiloxane having in a molecule at least one hydrogen atom directly attached to a silicon atom, and at least one of epoxy radicals and trialkoxysilyl radicals each attached to a silicon atom through a carbon atom or a carbon atom and an oxygen atom, and
   (E) a carboxylic anhydride.

2. The curable composition of claim 1 wherein the organosiloxane (D) further has a perfluoroalkyl or perfluoropolyether radical attached to a silicon atom through a carbon atom.

3. The curable composition of claim 1 wherein the fluorinated amide compound (A) is of the following general formula (1):

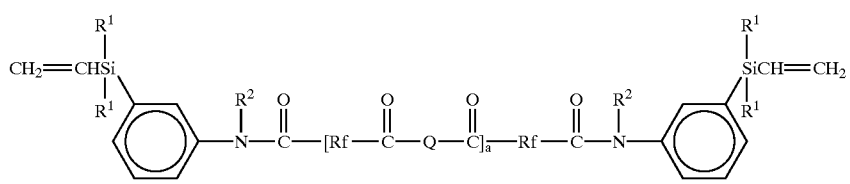

wherein R$^1$ is a substituted or unsubstituted monovalent hydrocarbon radical,
R$^2$ is hydrogen or a substituted or unsubstituted monovalent hydrocarbon radical, Q is a radical of the following general formula (2) or (3):

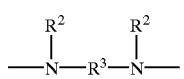

(2)

wherein R$^3$ is a substituted or unsubstituted divalent hydrocarbon radical which may be separated by at least one atom of oxygen, nitrogen and silicon atoms, and R$^2$ is as defined above,

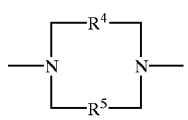

(3)

wherein R$^4$ and R$^5$ each are a substituted or unsubstituted divalent hydrocarbon radical,
Rf is a divalent perfluoroalkylene or perfluoropolyether radical, and
"a" is an integer of at least 0.

4. The curable composition of claim 1 wherein the fluorinated organohydrogensiloxane (B) has at least one of monovalent perfluorooxyalkyl, monovalent perfluoroalkyl, divalent perfluorooxyalkylene and divalent perfluoroalkylene radicals and at least two hydrosilyl radicals in the molecule.

5. The curable composition of claim 1, wherein the fluorinated amide compound (A) has at least two alkenyl radicals one at each end of the molecule.

6. The curable composition of claim 3, wherein:

$R^1$ stands for a monovalent hydrocarbon radical of 1 to 10 carbon atoms which is an alkyl, cycloalkyl, alkenyl, phenyl, tolyl, xylyl, naphthyl, benzyl, phenylethyl or phenylpropyl radical, each optionally substituted by halogen atoms;

$R^2$ stands for hydrogen or a monovalent hydrocarbon radical of 1 to 10 carbon atoms which is an alkyl, cycloalkyl, alkenyl, phenyl, tolyl, xylyl, naphthyl, benzyl, phenylethyl or phenylpropyl radical, each optionally substituted by halogen atoms;

$R^3$ is a divalent hydrocarbon radical of 1 to 20 carbon atoms, which is an alkylene, cycloalkylene, phenylene, tolylene, xylylene, naphthylene or biphenylene radical, each optionally substituted by halogen atoms and each optionally containing one or more atoms of oxygen, nitrogen and silicon atoms at an intermediate of its linkage;

$R^4$ and $R^5$ are independently a divalent hydrocarbon radical of 1 to 10 carbon atoms which is an alkylene or cycloalkylene radical optionally substituted by halogen atoms; and a is an integer of 0 to 10.

7. The curable composition of claim 1, wherein the fluorinated organohydrogensiloxane (B) is provided in an amount of 0.5 to 5 mol per mol of aliphatic unsaturated radicals in the composition.

8. The curable composition of claim 1, wherein the platinum group compound (C) is provided as a solution of chloroplatinic acid or a complex thereof in a solvent admixed with the fluorinated amide compound (A) in a miscible manner.

9. The curable composition of claim 1, wherein the organosiloxane (D) is of one of the following formulae:

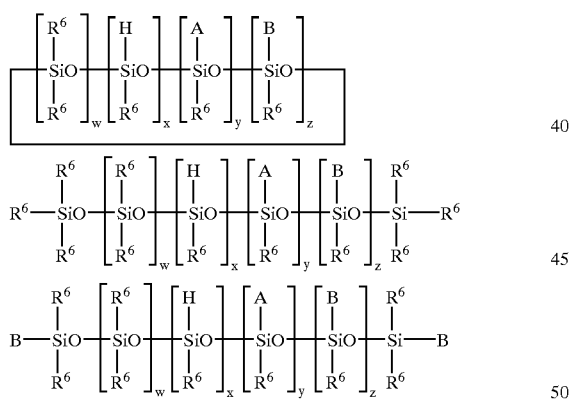

wherein $R^6$ is a substituted or unsubstituted monovalent hydrocarbon radical, A is an epoxy and/or trialkoxysilyl radical attached to a silicon atom through a carbon atom or a carbon atom and an oxygen atom, B is a perfluoroether or perfluoroalkyl radical attached to a silicon atom through a carbon atom, letters w, x and z each are an integer inclusive of 0, and letter y is an integer of at least 1, and w+x+y+z is from about 2 to 60.

10. The curable composition of claim 1, wherein the amount of the organosiloxane (D) is 0.1 to 20 parts by weight per 100 parts by weight of component (A).

11. The curable composition of claim 1, wherein the carboxylic anhydride (E) is one of the following compounds:

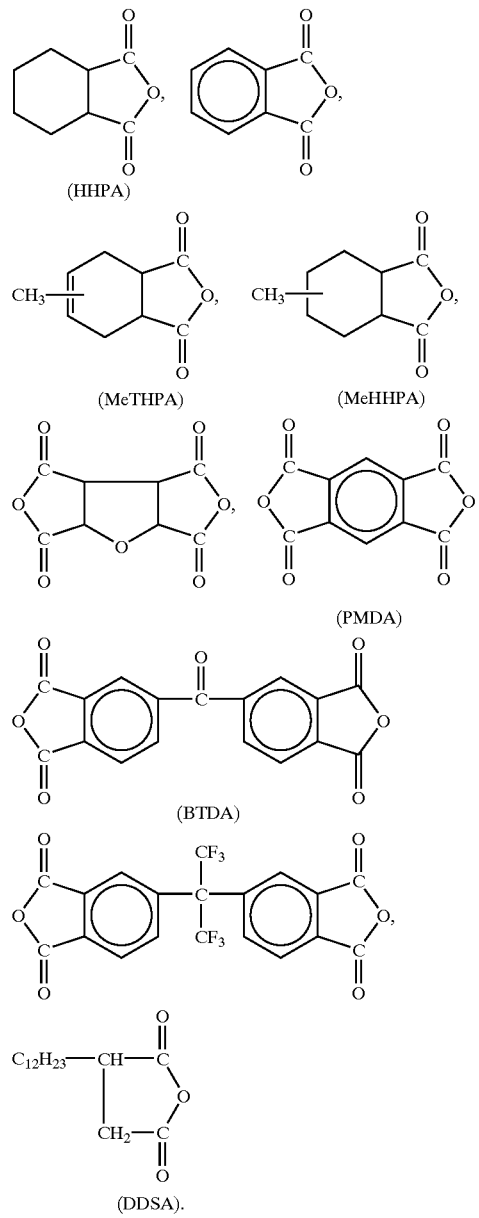

12. The curable composition of claim 1, wherein the amount of component (E) is 0.1 to 4 parts by weight per 100 parts of component (A).

* * * * *